9373X
W. L. Elgar,
Water Wheel.
Patented Feb 10, 1836.
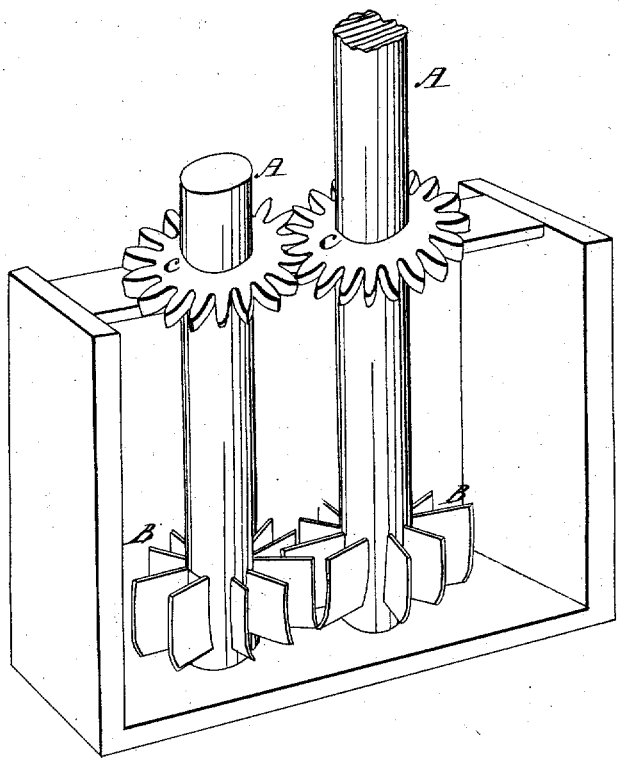
N. PETERS, PHOTO-LITHOGRAPHER, WASHINGTON, D. C.

9373X

Feb. 10. 1836 225

William L. Elgar, of Winchester New Hampshire

Letters Patent.

The Schedule referred to in these Letters Patent and making part of the same, containing a description in the words of the said William L. Elgar himself of his improvement in the twain water wheel.

To all to whom these presents shall come.
Be it known that I William L. Elgar, of Winchester in the County of Cheshire and State of New Hampshire, have invented a New and useful Water wheel and that the following is a full and exact description thereof.

The wheel which I denominate the Twain wheel is constructed with two perpendicular shafts with buckets or floats at the bottom (when placed in a perpendicular position) and the water to be applied to the centre so as to exert its power upon both – The power to be applied to Mills or Machinery of any description is applied by attaching it to one or both of the cog wheels at the top of the perpendicular shafts. The above described wheel may be used and the water power applied to it with equal force when placed in a horizontal position, and the intention of the inventor is, to use it in a perpendicular or horizontal position as circumstances, situation of water and the application of Machinery or Mills may require. What I claim as my own invention, and not previously known or used in the above described water wheel is the applying the two wheels together thereby obtaining a much greater power from the same quantity of water Witnesses. Daniel A. Harrington
Horace Chapin Wm L. Elgar Exd [illegible]

[300 Words]

(Patented 10 Feby 1836)

[illegible]